United States Patent [19]

Marche

[11] Patent Number: 5,755,403
[45] Date of Patent: May 26, 1998

[54] AIRCRAFT MOTOR POD INCLUDING A PIVOTABLE POD COWLING

[75] Inventor: Hervé Marche, Roquettes, France

[73] Assignee: Societe Nationale Industrielle et Aerospitiale, Aris Cedex, France

[21] Appl. No.: 652,002

[22] Filed: May 23, 1996

[30] Foreign Application Priority Data

May 24, 1995 [FR] France ................ 95 06206

[51] Int. Cl.⁶ .............. B64C 7/02; B64D 29/08
[52] U.S. Cl. ............. 244/54; 244/129.5; 60/39.31
[58] Field of Search ............... 244/54, 129.4, 244/129.5; 60/39.31

[56] References Cited

U.S. PATENT DOCUMENTS

| | | |
|---|---|---|
| 2,494,347 | 4/1950 | Matthews et al. |
| 4,524,485 | 6/1985 | Harris ............... 244/129.4 X |
| 4,697,763 | 10/1987 | Vermilye ........... 244/129.4 |
| 5,157,915 | 10/1992 | Bart ................... 244/54 X |
| 5,203,525 | 4/1993 | Remlaoui ........... 244/129.4 |
| 5,350,136 | 9/1994 | Prosser et al. .... 244/129.4 |

FOREIGN PATENT DOCUMENTS

| | | |
|---|---|---|
| 0 126 840 | 5/1994 | European Pat. Off. |
| WO 93/06006 | 4/1993 | WIPO |

Primary Examiner—William Grant
Attorney, Agent, or Firm—Burns, Doane, Swecker & Mathis LLP

[57] ABSTRACT

The invention concerns a pod (16) of an aircraft motor (10) suspended from a pole (14) and comprising a pod cowling (24) joined to the pole (14) along a hinge pin (26) which forms a first angle α with a first plane (27) passing through the axis of the motor and perpendicular to a second median plane (29) of the pole. According to the invention, the hinge pin (26) forms a second angle β with the median plane (29) so as to make the closing elements of the cowling (25) coincide with complementary corresponding elements of the adjacent edges (30) of the pod (16) when the cowling is closed.

6 Claims, 3 Drawing Sheets

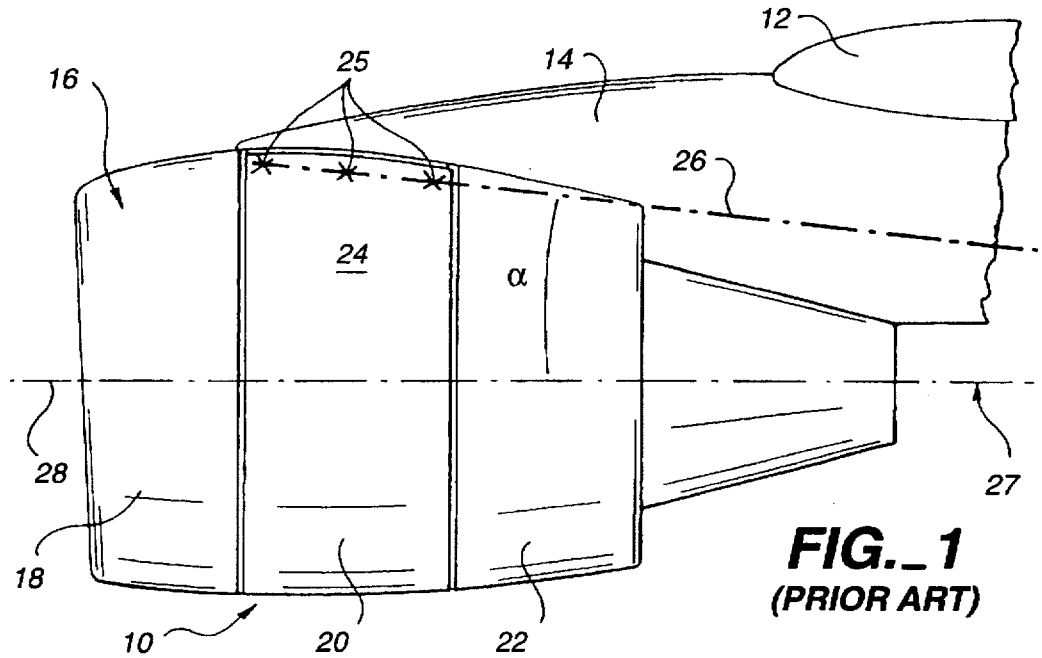
FIG._1
(PRIOR ART)
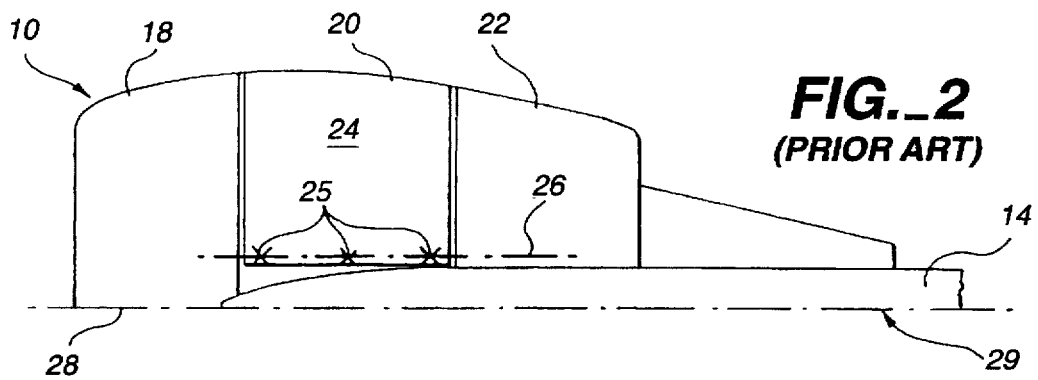
FIG._2
(PRIOR ART)
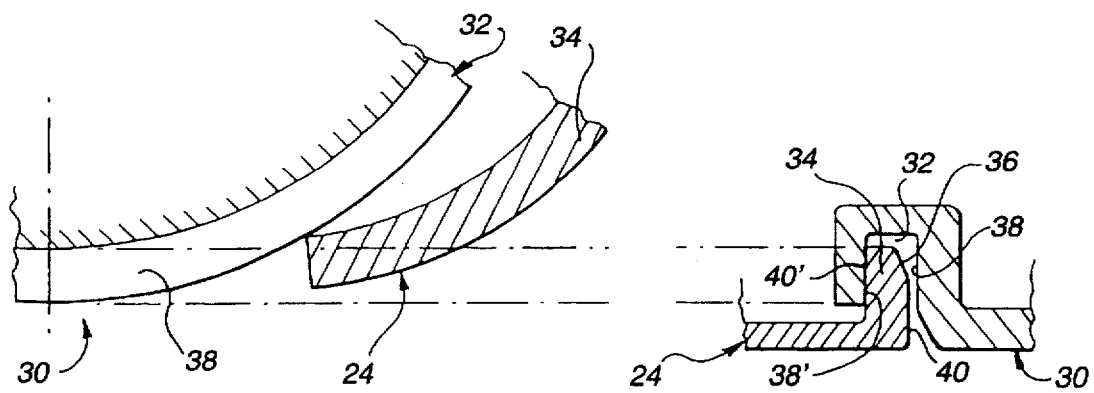
FIG._3A
(PRIOR ART)
FIG._3B
(PRIOR ART)

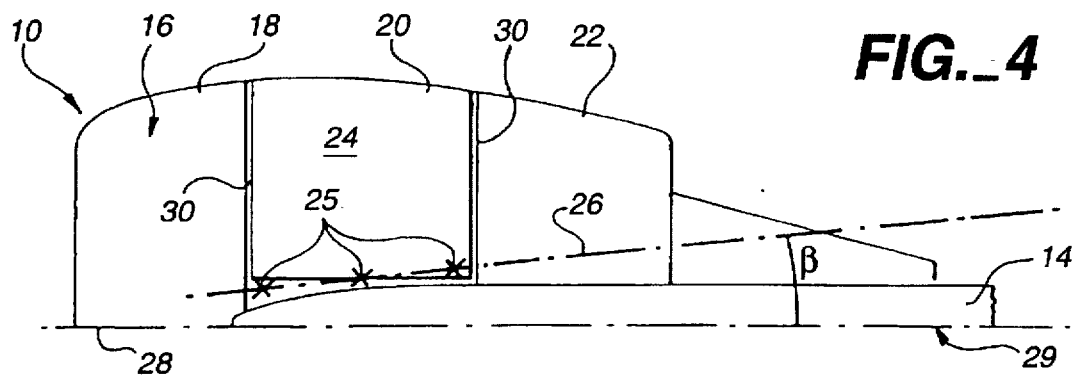
FIG._4
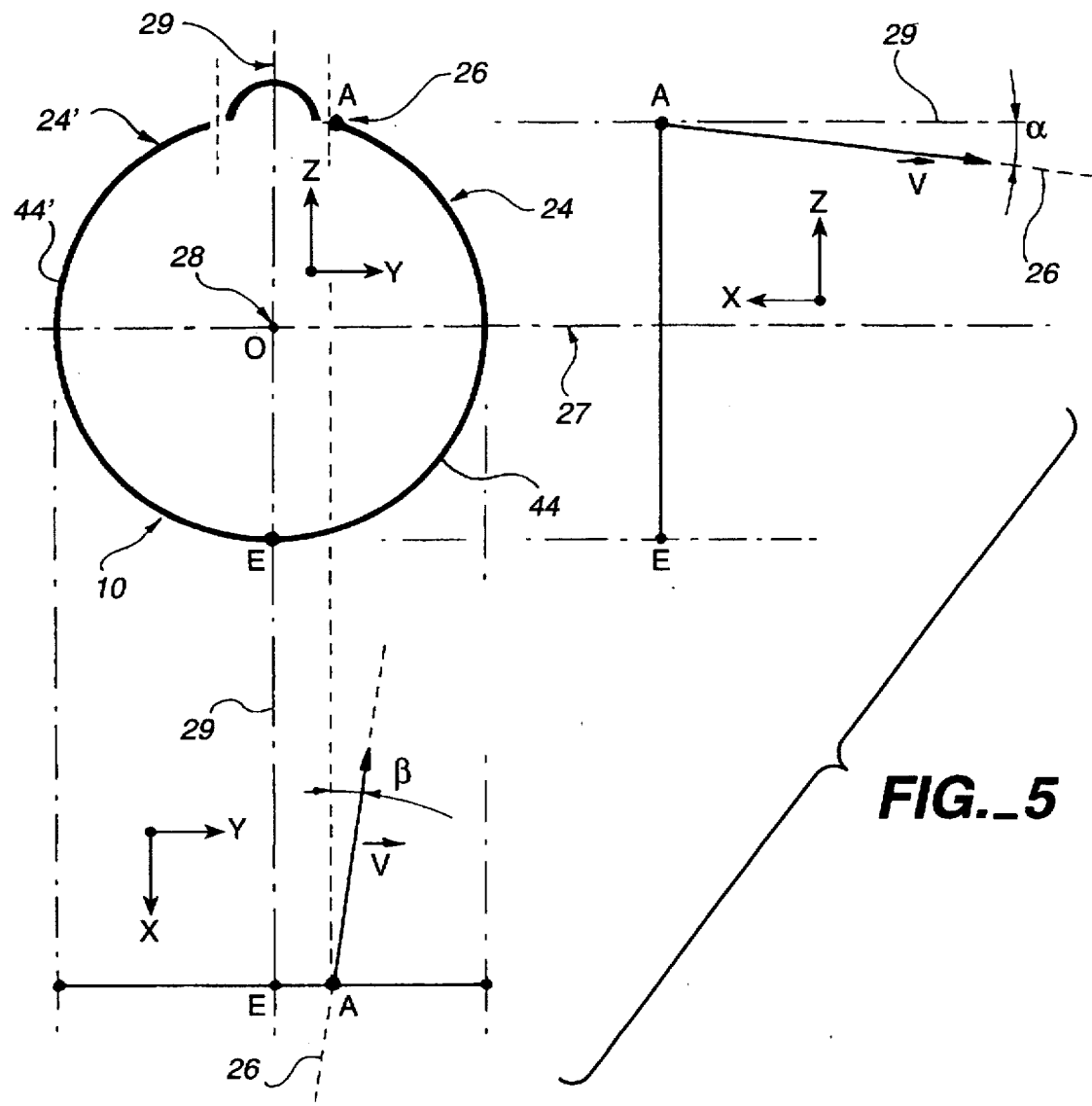
FIG._5

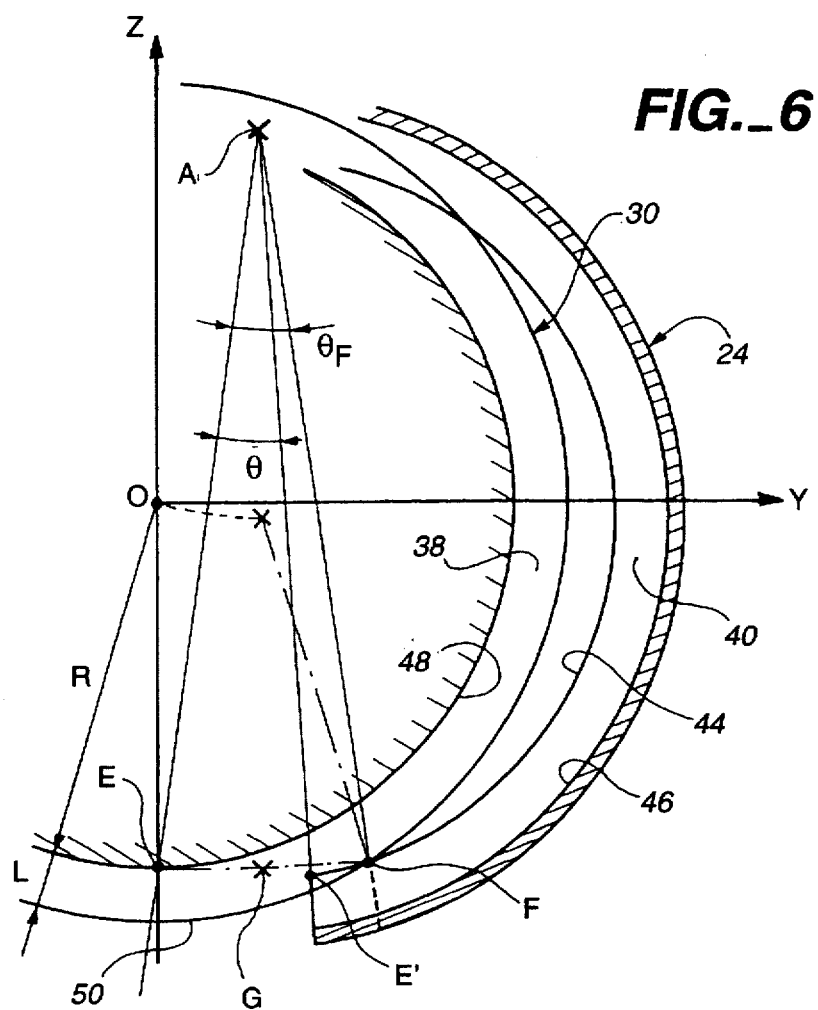
FIG._6
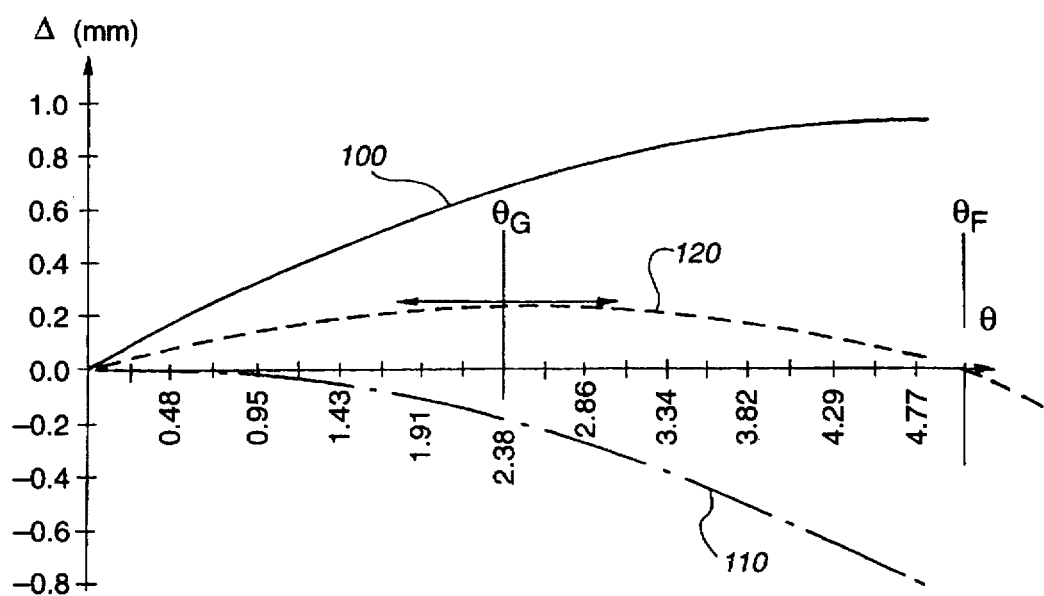
FIG._7

AIRCRAFT MOTOR POD INCLUDING A PIVOTABLE POD COWLING

FIELD OF THE INVENTION

The present invention concerns an aircraft pod comprising one or several pod cowlings.

The pod cowlings allow access to be gained to the inside of the pod which generally contains items of equipment or accessories of the motor. The object of the invention is to improve the closing and opening of the cowlings and in particular to improve the coincidence of the adjacent edges of the cowling and pod having complementary closing elements.

The invention can be applied to any type of aircraft power unit or motor comprising a pod and in particular to reactors and turboreactors.

BACKGROUND OF THE INVENTION

As shown in FIG. 1, which is a diagrammatic view of an aircraft power unit 10 suspended from a wing unit element 12 partially represented by a pole 14, the pod 16 of the motor 10 generally comprises three portions. A front portion 18 forms an air intake opening for channeling the entering flow of air to, for example, a blower (not shown) of the motor. The other portions are a central portion 20 and a rear portion 22.

Throughout the text, the terms "front" and "rear" of the pod or motor are understood in relation to the direction of the air flow created by the motor when functioning. The front part of the pod thus corresponds to the air inlets and the rear to the air outlet of the motor.

The outer casing of the intermediate portion 20 is formed by one or several cowlings 24. In FIG. 1, a single cowling 24 is visible. The cowling 24 is pivotally fixed to the support pole 14 of the motor with the aid of several joints 25 disposed along a hinge pin 26. The cowling 24 extends from the support pole 14 over almost a half circumference of the pod 16.

Owing to the shape of the pod 16 and in particular the curve of its outer wall in the direction of the axis of the motor, according to aerodynamic lines, the hinge pin 26 forms and angle α opening towards the front of the motor with a first plane 27 perpendicular to a second median plane 29 of the pole and containing a longitudinal axis along the spindle 28 of the motor. The first and second planes 27, 29 approximately coincide with a horizontal plane and a vertical plane, respectively, and their intersection is parallel to the axis of the motor when the latter is mounted on the pole 14, as shown in FIGS. 1 and 2.

FIG. 2 is a top view of the motor of FIG. 1 and shows that the hinge pin 26 in known motors is parallel to the second median plane of the pole which bears the reference 29.

During flight, when the cowlings are closed, the aerodynamic loads exerted on the pod cowlings are transmitted to the pole mainly by means of the motor and closing systems situated at the front or rear of the cowlings. The closing systems each comprise an annular ring and a corresponding annular groove forming complementary load transmission elements. As shown by way of example in FIGS. 3A and 3B which illustrates transverse and longitudinal cross sections details of the closing system, the rear edge of the cowing 24 and one edge 30 of the motor are equipped with an annular ring 34 and annular groove 32, respectively. The annular ring 34 integral with the cowling 24 is engaged in the annular groove 32 and allows forces to be transmitted to the motor. For the transmission of forces applied along the axis of the motor, the annular grooves and rings comprise force transmission surfaces 38 and 38' for the annular groove 32 and force transmission surfaces 40 and 40' for the annular ring 34.

When opening and closing the cowling pods, there is a problem of alignment between the mobile portion and the fixed portion of the closing systems, that is between each annular ring 34 and the corresponding annular groove 32. Owing to the angle α the hinge pin 26 makes with the horizontal plane 27 passing through the axis of the motor, the annular ring is not in the same plane as the annular groove in the closed position of the cowling, and an offset appears as soon as the cowling forms a small angle with respect to the closed position.

Thus, the lower extremity of the annular ring is offset towards the rear with respect to the annular groove close to their point of engagement, that is when the cowling forms a small angle of about 3° with respect to its closed position on the pod.

So as to facilitate engagement, as shown in FIG. 3, it is normal usage to form a sloping edge 36 on at least one of the sides of the annular ring 34 and/or the annular groove so as to authorize a slight lateral sliding of these portions. This characteristic facilitates the opening and closing of the cowling but reduces the contact surface between the annular rings and the annular grooves when the cowling is closed. In addition, by forming a bezel on the annular rings and/or in the annular grooves, one part of the axial force to be transmitted is transformed into a radial force which increases the peripheral tensions on the cowling causing loads on the braces and nuts. As a result, the quality of the transmission of the aerodynamic forces is affected, which counters the main function of the closing system.

One aim of the present invention is thus to offer a solution to the problem of misalignment between the complementary elements of the closing system when opening and closing the cowling.

SUMMARY OF THE INVENTION

To attain this aim, the invention more particularly concerns a pod of an aircraft motor suspended from a support pole along a motor axis, the pod comprising at least one pod cowling, the cowling extending along a circumference portion of the pod and comprising opening and closing joints disposed along a hinge pin forming a first angle α between the hinge pin and a first plane containing the axis of the motor, the angle α opening towards the front of the motor. The front and rear edges of the cowling and the adjacent edges of the pod comprising complementary elements integral with the cowling and the pod, respectively, and being mutually engaged during a cowling closing movement. The hinge pin, in addition, forming a second angle β with the second plane which is perpendicular to the first plane, the angle β opening towards the rear of the motor. The angles α and β make the complementary elements of the cowling and the pod coincide during the cowling opening and closing movements.

By means of the invention, the angle β the hinge pin forms with respect to a plane approximately vertical passing through the pole makes it possible to correct the lateral misalignment between the complementary elements of the closing system, especially during the engagement of these complementary elements. That is, the angle β corrects misalignment when the cowling forms a small angle with respect to the position where it is locked on the pod at the time it is closed. The inclination along the angle β thus makes it possible to correct the misalignment caused by the angle a the hinge pin forms with a horizontal plane. Moreover, the combination of the angles α and β make it possible to retain a hinge pin extending along the aerodynamic lines of the pod.

According to one characteristic of the invention, the complementary elements integral with the cowling and pod respectively comprise force transmission surfaces for forces applied along the axis of the motor, these surfaces extend approximately along the front and rear edges of the cowling and along the adjacent edges of the pod. These surfaces are delimited on each of the complementary elements by an external and internal edge, respectively. The external and internal edges are understood to be respectively the edge most distant from and the edge closest to the axis of the motor.

In accordance with the invention, the value of the angle β may be selected so that the component along an axis X parallel to the axis of the motor of the vectorial product of a vector $\vec{V}$ defining the hinge pin by a vector $\vec{AE}$ being approximately nil, the vector $\vec{AE}$ being formed by a bipoint situated inside a reference plane approximately perpendicular to the axis of the motor close to a first force transmission surface extending along the adjacent front edge of the pod, this bipoint corresponding respectively to a midpoint between a point A of the hinge pin and to a point E situated at the lower extremity of the internal edge of the said first range.

When the component along the axis X of the vector is nil, the misalignment between the complementary elements and more particularly between the force transmission surfaces is almost compensated concerning the engagement position of the cowling, that is when the cowling forms a slight angle with respect to the closed position. Depending on a particular choice of the value if the angle β, the latter approximately verifies the following formula:

$$((Y_A-Y_E)\tan\alpha)+((Z_A-Z_E)\tan\beta)=0$$

where $Y_A$ and $Y_E$ are respectively the coordinates of the points A and E along an axis Y and where $Z_A$ and $Z_E$ are respectively the coordinates of the points A and E along an axis Z, the axes X, Y and Z forming an orthogonal reference system where the axis Y is parallel to the first plane and the axis Z parallel to the second plane.

According to a particular example where the inclination of the hinge pin α is approximately 4.58°, the angle β is approximately 0.6°.

According to an advantageous improvement of the invention, the angle β is selected so that the component along an axis X parallel to the axis of the motor of the vectorial product of a vector $\vec{V}$ defining the hinge pin by a vector $\vec{AG}$ is approximately nil, the vector $\vec{AG}$ being formed by a bipoint situated inside a reference plane approximately perpendicular to the axis of the motor and close to a first and second force transmission surface extending along the front edges of the cowling and pod respectively, this bipoint corresponding respectively to a point A of the hinge pin and a point G, the geometrical center between a point E and a point F, the point E being situated at the lower extremity of the internal edge of said second stress transmission surface and the point F corresponding to the coincidence of the lower extremity of the internal edge of said first stress transmission surface and the outer edge of said second force transmission surface at the time of a movement for closing the cowling.

Therefore, when the component along the axis X of the vector $\vec{V}\wedge\vec{AG}$ is approximately nil, the misalignment provoked by the inclination of the hinge pin is compensated when the internal edge of the force transmission range of the complementary element integral with the cowling encounters the outer edge of the force transmission range of the element integral with the motor. When the complementary elements comprise a set of annular rings and annular grooves, this corresponds to the moment when the rings start to become engaged in the grooves of the closing system.

The angle β may be preferably selected so as to approximately check the equation:

$$((Y_G-Y_A)\tan\alpha)+((Z_G-Z_A)\tan\beta)=0$$

where $Y_A$ and $Y_G$ are respectively the coordinates of the points A and G along an axis Y and where $Z_A$ and $Z_G$ are respectively the coordinates of the points A and G along an axis Z, the axes X, Y and Z forming an orthogonal reference system where the axis Y is parallel to the first plane and the axis Z parallel to the second plane.

BRIEF DESCRIPTION OF THE DRAWINGS

Other characteristics and advantages of the invention shall appear more readily from a reading of the following nonrestrictive description given by way of illustration with reference to the accompanying drawings:

FIG. 1, already described, is a diagrammatic lateral view of an aircraft propulsion system equipped with a pod and showing the angle α a hinge pin of a pod cowling makes with a horizontal plane passing through the axis of the propulsion system, according to the prior art;

FIG. 2, already described, is a partial top diagrammatic view of the propulsion system of FIG. 1 showing the hinge pin parallel to a median vertical plane of the pole and passing through the axis of the propulsion system according to the prior art;

FIG. 3A and 3B, already described, show a diagrammatic transverse section of the details of the pod and cowling and a longitudinal section of details of a cowling closing system and the pod according to the prior art;

FIG. 4 is a view similar to FIG. 2 illustrating a propulsion system conforming to the invention in which the hinge pin of the pod cowling forms a certain angle β with the vertical plane;

FIG. 5 is an simplified diagrammatic representation of a transversed section of the central portion of the propulsion system of FIG. 4 and its projections;

FIG. 6 is a simplified diagrammatic transverse section of the central portion of the propulsion system of FIG. 4 showing force transmission surfaces; and FIG. 7 is a graph expressing a misalignment Δ (in mm) of the force transmission surfaces according to the opening angle θ of the cowling (in degrees) for different values of the angle β.

DETAILED DESCRIPTION OF THE PREFERRED EMBODIMENTS

Identical references are used for identical or similar parts appearing in the various figures.

FIG. 4 represents an aircraft propulsion system 10 conforming to the invention and suspended from a pole 14. The propulsion system 10 has a pod 16 with a front portion 18, a central portion 20 and a rear portion 22.

The central portion 20 of the pod comprises cowlings 24 (only one of these being visible on the Figure) pivotally fixed at joints 25 to the support pole 14 of the propulsion system 10.

The joints 25 are disposed along a hinge pin 26 which, as in known propulsion systems, forms an angle $\alpha$ with the horizontal plane 27 passing through the longitudinal axis of the motor spindle 28. In this respect, reference may be made to FIG. 1. The angle $\alpha$ enables the hinge pin to adapt itself to the aerodynamic lines of the pod. Generally speaking, this angle $\alpha$ is open towards the front, that is the hinge pin 26 leans towards the rear. Depending on the type of model of the pod, the angle $\alpha$ may vary between about 2 and 7 degrees.

In accordance with the invention, when closing and opening the cowling, so as to limit the displacements between the annular rings and the annular grooves which constitute the complementary elements of the stress transmission system between the cowling 24 and the pod 16, the hinge pin 26 forms, in addition, a second angle $\beta$, generally open towards the rear, with a median plane 29 of the pole 14 containing the axis 28 of the motor. The plane 29 is perpendicular to the plane 27 which is approximately horizontal and visible in FIG. 1. The planes 27 and 29 are cut along the axis 28.

FIG. 5 shows and extremely simplified transverse cross section of the central portion of the pod 10 which comprises two cowlings 24 and 24' in a closed position fixed to the pole 14 by joints. For reasons of simplifications of the figure, only the internal edges 44, 44' of the force transmission surfaces placed at the front of the cowlings are shown. For example, the edges correspond to the top of the annular rings equipping the front edges of the cowlings. Furthermore, the following description only concerned the cowling 24 on the right portion of the figure. However, the invention is also applicable to the cowling 24'.

The cowling 24, which extends approximately over a half circumference of the pod, is joined to the pole along the hinge pin 26.

The point A of FIG. 5, visible on the transverse section and on its projections, is a point of the hinge pin 26 situated inside a reference plane perpendicular to the side 28 of the motor, that is merged with the plane of the figure. The reference plane is close to the annular ring and annular groove system of the front edge of the cowling.

The point E, also situated inside the reference plane, is placed at the lower extremity of the internal edge 44.

An orthogonal reference system whose center point O is situated at the center of the motor, is orientated with the axes X, Y and Z extending respectively towards the front along the axis 28 of the motor, along the plane 27 and along the plane 29.

The coordinates of the point A and point E are designated in this reference system by $X_A$, $Y_A$, $Z_A$, $X_E$, $Y_E$ and $Z_E$ respectively along the directions X, Y and Z.

Also, the vector $\overrightarrow{AE}$ determined by the bipoint A and E is considered whose coordinates are thus $(0, Y_E-Y_A, Z_E-Z_A)$ and a standardized vector $\overrightarrow{V}$ defining the hinge pin 26. In accordance with the invention, the vector $\overrightarrow{V}$ forms an angle $\alpha$ and an angle $\beta$ with respect to the planes 29 and 27 respectively and its coordinates are $(1, \tan\beta, -\tan\alpha)$.

According to a first implementation of the invention, the angle $\beta$ is selected so as to approximately cancel the component along the axis X of the vector V$\wedge$AE. Thus, the angle $\beta$ verifies the following equation:

$$(Y_A - Y_E)\tan\alpha + (Z_A - Z_E)\tan\beta \cong 0$$

$$\text{let } \beta \cong \arctan\left(\frac{Y_A - Y_E \tan\alpha}{Z_E - Z_A}\right)$$

So as to check the improvement obtained by means of the invention, it is possible to calculate the displacement along the axis X of the extremity of the cowling for various opening angles of the cowling. For details of these calculations, reference may be made to FIG. 6.

FIG. 6 diagrammatically represents stress transmission surfaces 40, 38, respectively, of the complementary closing elements of the front edge of the cowling 24 and adjacent edge 30 of the pod. The surfaces 40, 38 are delimited by internal and external edges 44, 46, 48 and 50, respectively. By way of example, the surfaces 40, 38 are the flanks of an annular ring and an annular groove, respectively, as shown on FIG. 3.

FIG. 6 shows the points A, E and O defined above. A point E' is defined as being situated inside the reference plane on the lower extremity of the internal edge 44 of the cowling 24. Moreover, the point F corresponds to the coincidence of the point E' with the outer edge 50 of the surface 38 integral with the pod at the time of an opening or closing movement of the cowling. In other words, when closing the cowling, the point F corresponds to the start of the engaging of the annular ring in the annular grooves of the closing system described above.

R denotes the radius of the internal edge 48 and L denotes this distance separating the edges 44 and 46 and the edges 48 and 50, respectively. L may also be described as being approximately the height of the annular rings or the depth of the annular grooves.

Finally, $X_F$, $Y_F$ and $Z_F$ are the coordinates of the point F along the axes X, Y and Z respectively. Thus, the following equations are verified:

(1): $Y_F^2 + Z_F^2 = R^2 + 2RL + L^2$ (F on the circle centered at O with radius R+L)

(2): $(Y_F - Y_A)^2 + (Z_F - Z_A)^2 = Y_A^2 + (Z_A + R)^2$ (F on the circle centered at A, radius $\overline{AE}$)

By combining the equations (1) and (2), the following is obtained:

$$Z_F = \left(\frac{-Y_A}{Z_A}\right)Y_F + K \quad (3)$$

where $$K = \frac{RL + \frac{L^2}{2} - Z_A R}{Z_A}$$

The value of $Y_F$ is obtained by resolving the equation (1) where $Z_F$ has been replaced by the value given by the equation (3): $X_F$ is obtained by replacing $Y_F$ by its value in the equation (3).

Furthermore, the angle $\theta_F$ is determined as:

$$\theta_F = 2\arcsin\left(\frac{\overline{EF}}{\frac{2}{\overline{AE}}}\right)$$

where $\overline{EF}$ and $\overline{AE}$ denote the respective distance between the points E and F and between the points A and E.

FIG. 7 shows the values of $X_F$, that is, of the misalignment $\Delta$ (in mm) of the extremity of the annular ring and the annular groove of the cowling and pod for various values of θ (in degrees) between 0 and the angle $\theta_F$ corresponding to the angle EÂF. The curve 100 correspond to a cowling where the angle β is nil, that is a cowling conforming to the state of the art. The curve 110 corresponds to a cowling according to the embodiment described above with α=4.75° and β=0.41°. It is to be noted that, especially for small values of θ, the misalignment between the extremity of the cowling and the adjacent edge of the pod is reduces considerably with a system conforming to the invention.

According to another embodiment of the invention, the angle β is selected so as to render the component nil along the axis X of the vector $\vec{V}\wedge\vec{AG}$ where the vector $\vec{AG}$ is defined by the bipoint including the point A and the point G, the geometric center of gravity of the points E and F defined above and shown in FIG. 6.

The coordinates $Y_G$ and $Z_G$ of the point G along the axes X and Y are such that:

$$Y_G = \frac{Y_E + Y_F}{2} \text{ and } Z_G = \frac{Z_E + Z_F}{2}$$

The angle β is selected as to verify the following equation:

$$(Y_G - Y_A)\tan\alpha + (Z_G - Z_A)\tan\beta = 0$$

$$\text{let } \beta = \arctan\left(\frac{Y_G - Y_A}{Z_G - Z_A}\tan\alpha\right)$$

The curve 120 of FIG. 7 gives the values of $X_F$, that is, of the misalignment Δ for various values of θ between 0 and $\theta_F$ with an angle β determined according to the above equation using the point G. The value of the angle β is β=0.21° in the case of the curve 120.

Using the point G for determining the angle β, the curve 120 shows that according to the second embodiment proposed the misalignment of the extremity of the cowling is still extremely small, regardless of the opening angle of the cowling. In addition, for opening angles of the cowling exceeding $\theta_F$, the misalignment remains small whereas it increases in the case of the curve 110.

Finally, by means of the invention and irrespective of the implementation described above, it is possible to align the cowling of the pod almost perfectly with the adjacent edges of the pod and especially for small opening angles θ of the cowling which correspond to the engaging of the annular ring in the annular groove of the closing an aerodynamic load transmission system.

In one embodiment variant, the annular ring or rings can also be integral with the motor, whereas the annular grooves are integral with the cowling.

What is claimed is:

1. A pod of an aircraft motor suspended from a support pole, the pod comprising:

at least one pod cowling extending along a portion of a circumference of a curved outer wall of the pod;

a plurality of joints disposed along a hinge pin for opening and closing the at least one pod cowling, the hinge pin defining a fixed hinge pin axis forming an angle α with a first plane containing a longitudinal axis of the motor, the angle α opening toward a front of the motor, the hinge axis further forming an angle β with a second plane which is perpendicular to the first plane and contains the longitudinal axis of the motor, the angle β opening toward a rear of the motor;

front and rear edges of the pod cowling and adjacent edges of the pod forming complementary elements which mutually engage when the pod cowling is in a closed position; and wherein the angles α and β are non-zero angles related such that the complementary elements of the pod cowling and the pod remain aligned during opening and closing of the pod cowling and engagement of the complementary elements.

2. Pod according to claim 1, wherein the complementary elements integral with the cowling and pod respectively comprise stress transmission surfaces for transmission of the stresses applied along the axis of the motor, these surfaces extending approximately along the front and rear edges of the pod cowling and along the adjacent edge of the pod, said surfaces being delimited on each complementary element by an outer edge and an internal edge respectively.

3. Pod according to claim 2, wherein the value of the angle β is selected so that a component along an axis X parallel to the axis of the motor of a vectorial product of a vector $\vec{V}$ defining the hinge pin by a vector $\vec{AE}$ is approximately nil, the vector $\vec{AE}$ being formed by a bipoint situated inside a reference plane approximately perpendicular to the axis of the motor and approximately adjacent a first stress transmission surface extending along the adjacent front edge of the pod, the bipoint corresponding respectively to a point between a point A of the hinge pin and a point E situated at the lower extremity of the internal edge of said first stress transmission surface.

4. Pod according to claim 3, wherein the angle β is selected so as to approximately verify the following formula:

$$((Y_A - Y_E)\tan\alpha) + ((Z_A - Z_E)\tan\beta) = 0$$

where $Y_A$ and $Y_E$ are respectively the coordinates of the points A and E along an axis Y and where $Z_A$ and $Z_E$ are respectively the coordinates of the points A and E along an axis Z, the axes X, Y and Z forming an orthogonal reference system where the axis Y is parallel to the first plane and the axis z is parallel to the second plane.

5. Pod according to claim 2, wherein the value of the angle β is also selected so that a component along an axis X parallel to the axis of the motor of the vectorial product of a vector $\vec{V}$ defining the hinge pin by a vector $\vec{AG}$ is approximately nil, the vector $\vec{AG}$ being formed by a bipoint situated inside a reference plane approximately perpendicular to the axis of the motor and approximately adjacent a first stress transmission surface and second stress transmission surface both extending along the front edges of the cowling and pod respectively, the bipoint corresponding respectively to a point between a point A of the hinge pin and a point G, the geometric center of gravity between a point E and a point F, the point E being situated at the lower extremity of the internal edge of said second stress transmission surface and the point F corresponding to a coincidence of a lower extremity of the internal edge of said first stress transmission surface and of the outer edge of said second stress transmission surface at the time of a movement of closing the cowling.

6. Pod according to claim 1 wherein the angle α is approximately 4.58° and the angle β is approximately 0.6°.

* * * * *